United States Patent Office 3,225,106
Patented Dec. 21, 1965

3,225,106
TERMINALLY HALOGENATED OLEFINIC COMPOUNDS
Robert Rabinowitz, Stamford, Conn., assignor to American Cyanamid Company, New York, N.Y., a corporation of Maine
No Drawing. Filed Jan. 15, 1962, Ser. No. 166,412
7 Claims. (Cl. 260—649)

The present invention relates to the preparation of organic compounds having terminally halogenated olefin moieties. More particularly, the instant discovery concerns a simple and straightforward process for preparing these organic compounds according to the following equation:

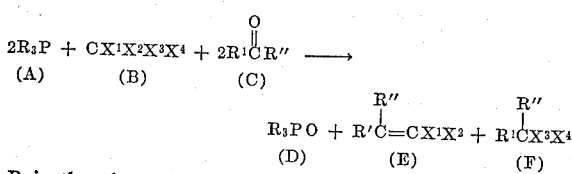

R in the above formulae represents alkyl ($C_1$–$C_{18}$), substituted and unsubstituted, aryl, substituted and unsubstituted, and cycloalkyl, substituted and unsubstituted; R' represents hydrogen, alkyl ($C_1$–$C_{12}$), alkenyl ($C_1$–$C_{12}$), phenyl, naphthyl, cyclohexyl, benzoyl, furfuryl, styrenyl, halo-substituted alkyl ($C_1$–$C_{12}$) halo-substituted phenyl; R'' represents hydrogen, alkyl ($C_1$–$C_{12}$), alkenyl ($C_1$–$C_{12}$), phenyl, naphthyl, cyclohexyl, furfuryl, styrenyl, halo-substituted alkyl ($C_1$–$C_{12}$), halo-substituted phenyl; and R' and R'' combined may represent the residue of fluorenone, 1-indanone, 2-indanone, 1-tetralone, indenone, anthrone and benzanthrone; X' represents hydrogen, chlorine, bromine and fluorine and $X^2$ represents chlorine, bromine and fluorine; $X^3$ and $X^4$ each represent chlorine, bromine and iodine.

Pursuant to the present invention a one-step process which is simple, straightforward and very desirable has been found for preparing a large number of organophosphorus compounds containing terminally halogenated olefins and represented by the product formula in the equation, supra.

According to the instant discovery a tertiary phosphine of the formula (A) is brought into reactive contact with a polyhalomethane (B) and a carbonyl compound (C) at a temperature in the range of —25° C. to 200° C., preferably 50° C. to 150° C. Superatmospheric pressure may be employed where it is necessary to contain the more volatile reactants. Generally, however, atmospheric pressure is adequate.

For best results the tertiary phosphine is first admixed with the carbonyl reactant and the resulting mixture contacted with the polyhalomethane compound. Any sequence of addition, however, may be employed.

Typical polyhalomethane reactants within the purview of the present invention are the following: $CCl_4$, $CCl_3Br$, $CCl_2Br_2$, $CClBr_3$, $CCl_3F$, $CCl_2F_2$, $CHCl_2F$, $CHBr_2F$, $CHBrClF$, $CHCl_2Br$, $CCl_3H$, $CHBr_3$, $CCl_3I$, and the like.

Typical carbonyl reactants useful in the process of the present invention for producing the corresponding products are the following: propionaldehyde, crotonaldehyde, chloral, n-heptaldehyde, furfural, benzaldehyde, m-chlorobenzaldehyde, cinnamaldehyde, acetone, methyl vinyl ketone, cyclohexanone, methyl cyclohexyl ketone, acetophenone, benzophenone, methyl β-naphthyl ketone, divinyl ketone, dibutyl ketone, didecyl ketone, fluorenone, chloranil, benzil.

Among the many tertiary phosphine reactants which may be employed for producing the products of the present invention are the following: tributylphosphine, tris(2-cyanoethyl)phosphine, tricyclohexylphosphine, diethylphenylphosphine, trimethylphosphine, trioctylphosphine, triisobutylphosphine, triisopropylphosphine, diethyl-p-bromophenylphosphine, triphenylphosphine, diethylpropylphosphine, diethyl - p - methoxyphenylphosphine, trioctadecylphosphine, tridodecylphosphine, and the like.

The reactants of the present invention are usually brought together in stoichiometric amounts, for instance, one mole of the aldehyde reactant with one mole of the tertiary phosphine in the presence of at least one mole of the polyhalomethane reactant. One-half mole of the ketone reactant per mole of the tertiary phosphine is generally employed, at least one mole of the polyhalomethane also being present.

Generally, an excess of the polyhalomethane is employed to provide a solvent medium. Other solvents within the purview of the instant discovery are inert organic solvents, such as aromatic hydrocarbons, cyclic ethers and non-cyclic ethers. Typical solvents are benzene, toluene, dioxane, tetrahydrofuran, methyl ethyl ether, diethyl ether, and the like.

In the case where high temperatures are employed a closed system is used, and autogenous pressure employed. The present invention will best be understood from the following illustrative examples:

EXAMPLE I

A mixture of 72 grams triphenylphosphine (0.274 mole) and 29 grams benzaldehyde (0.274 mole) is dissolved in 150 milliliters of carbon tetrachloride and the resulting mixture heated at 60° C. in a closed system for 2 hours, at which point, gas chromatographic analysis indicates that the reaction is complete. Addition of 200 milliliters of low boiling petroleum ether to the reaction mixture precipitates 69 grams of triphenylphosphine oxide. Fractional distillation of the filtrate gives less than 1 gram of unreacted benzaldehyde, 15.1 grams benzal chloride and 16 grams of β,β-dichlorostyrene.

EXAMPLE II

A mixture of 2.0 grams triphenylphosphine (0.00765 mole) and 0.92 gram acetophenone (0.00765 mole) is dissolved in 4.0 milliters of carbon tetrachloride. The reaction is complete as determined by gas chromatographic analysis, after 20 minutes at 60° C. followed by 72 hours at room temperature. The product 1,1-dichloro-2-phenyl-propene-1

is identified by mass spectroscopy. Recovery is accomplished as in Example I, supra, using 25 milliliters of petroleum ether.

EXAMPLE III

A mixture of 2.0 grams triphenylphosphine (0.00765 mole) and 0.87 gram benzaldehyde (0.00765 mole) is dissolved in 4 milliliters bromotrichloromethane. In 3 minutes a yellow color appears and heat is evolved. This evolution is controlled by cooling and this is continued for 10 minutes until there is no further heat evolution. The desired β,β-dichlorostyrene product is detected by mass spectroscopy and recovered as in Example I, supra, using only 20 milliliters of petroleum ether.

EXAMPLE IV

To a solution of 2.0 grams of triphenylphosphine (0.00765 mole), 0.87 gram of benzaldehyde (0.00765 mole) in 5 milliliters of benzene is added 0.81 gram dibromodifluoromethane. This is heated 19 hours at 60° C. An additional 0.81 gram dibromodifluoromethane is added and this solution heated for 5½ hours at 60° C.

The resulting β,β-difluorostyrene is identified by mass spectroscopy and recovered as in Example I, supra, using only 25 milliliters of petroleum ether.

EXAMPLE V

The following are charged into a 100 milliliter stainless steel autoclave: 2.17 grams benzaldehyde (0.023 mole), 5.0 grams triphenylphosphine (0.023 mole), 7 milliliters of benzene, and finally 7.0 grams dichlorodifluoromethane. This is heated at 110° C.–120° C. for 24 hours and 180° C. for 3 hours. The system is cooled, vented and the dichlorodifluoromethane allowed to evaporate. The resulting β,β-difluorostyrene is identified by vapor phase chromatography and recovered as in Example I, supra, using only 40 milliliters of petroleum ether.

EXAMPLE VI

Thirty-two and seven tenths grams (0.125 mole) of triphenylphosphine, 70 milliliters of carbon tetrachloride, and 22.8 grams (0.125 mole) of benzophenone are admixed and heated at 60° C. for 4 hours. The reaction mixture which results is first stripped (in vacuo, 22° C.) to remove excess $CCl_4$. The resulting mixture is then treated with cold ethanol, precipitate removed, and the precipitate treated with ethyl ether to dissolve desired product, 1,1-diphenyldichloroethylene. Ether removed by volatilization to leave crystalline product.

EXAMPLE VII

A solution of 15 grams triphenylphosphine (0.057 mole), 5.18 grams 9-fluorenone (0.0285 mole) in 30 milliliters carbon tetrachloride is heated at 65° C. for 6½ hours. The solution is then shaken with 25 grams water heated on a steam bath for 15 minutes. The mixture is extracted with $CHCl_3$, the extract dried over alumina and the volatiles removed under vacuum. The residue is triturated with ethanol and cooled to −10° C. A total of 6.3 grams of 9-dichloromethylenefluorene is isolated. The filtrate is devolatilized and the residue triturated with ethyl ether at −15° C. to give 14.5 grams of triphenylphosphine oxide.

*Table I*

| Exam. No. | $R_3P$ (A) $R^3$ | $CX^1X^2X^3X^4$ (B) $X^1$ | $X^2$ | $X^3$ | $X^4$ | $R^1\overset{O}{\underset{\|}{C}}R''$ (C) | Molar ratio A:B:C | Temp., °C | Solv. | $R^1C=CX^1X^2$ with $R''$ (E) |
|---|---|---|---|---|---|---|---|---|---|---|
| VIII | Tributyl- | Cl | Cl | Cl | Cl | Propionaldehyde | 1  5  1 | −25 | None | $CH_3CH_2CH=CCl_2$ |
| IX | Tricyclohexyl- | Cl | Cl | Cl | Br | Crotonaldehyde | 1  2  0.5 | 30 | Benzene | $CH_3CH=CH-CH=CCl_2$ |
| X | Tris(2-cyanoethyl)- | Cl | Cl | Br | Br | Chloral | 1  3  1 | 100 | Toluene | $CCl_3CH=CCl_2$ |
| XI | Diethylphenyl- | Cl | Br | Br | Br | n-Heptaldehyde | 1  5  1 | 0 | None | $n\text{-}C_6H_{13}CH=CClBr$ |
| XII | Trimethyl- | F | Cl | Cl | Cl | Furfural | 1  8  1 | 75 | Dioxane | furyl–CH=CClF |
| XIII | Trioctyl- | F | F | Cl | Cl | m-Chlorobenzaldehyde | 1  10  1 | *200 | Benzene | (m-Cl-C₆H₄)–CH=CF₂ |
| XIV | Triisobutyl- | H | F | Br | Br | Cinnamaldehyde | 1  2  1 | −20 | Ethyl ether | C₆H₅–CH=CH–CH=CHF |
| XV | Triisopropyl- | H | F | Cl | Br | Acetone | 1  3  0.5 | 0 | Tetrahydrofuran | $(CH_3)_2C=CHF$ |
| XVI | Diethyl-p-bromophenyl- | H | Cl | Cl | Br | Methyl vinyl ketone | 1  8  0.5 | 30 | None | $CH_3\overset{\|}{\underset{CHCl}{C}}-CH=CH_2$ |
| XVII | Triphenyl- | H | Cl | Cl | Cl | Cyclohexanone | 1  5  0.5 | *175 | do | cyclohexylidene=CHCl |
| XVIII | Diethylpropyl- | H | Br | Br | Br | Methyl cyclohexyl ketone | 1  5  0.5 | 10 | do | $CH_3\overset{\|}{\underset{CHBr}{C}}-\text{cyclohexyl}$ |
| XIX | Diethyl-p-methoxyphenyl- | Cl | Cl | Cl | Cl | Benzophenone | 1  5  0.5 | 0 | do | $Ph_2C=CCl_2$ |
| XX | Trioctadecyl- | Cl | Cl | Cl | I | Methyl β-naphthyl ketone | 1  5  0.5 | −20 | Toluene | $CH_3\overset{CCl_2}{\underset{\|}{C}}=\text{(β-naphthyl)}$ |
| XXI | Tridodecyl- | Cl | Cl | Cl | Cl | Benzil | 1  5  0.25 | 10 | None | $Ph\text{-}C(=CCl_2)\text{-}C(=CCl_2)\text{-}Ph$ |
| XXII | Triphenyl- | Cl | Cl | Cl | Cl | 1-indanone | 1  10  0.5 | 60 | do | indanylidene=CCl₂ |

*Footnote at end of table.

Table I—Continued

| Exam. No. | $R_3P$ (A) $R_3$ | $CX^1X^2X^3X^4$ (B) $X^1$ $X^2$ $X^3$ $X^4$ | $R'\overset{O}{\underset{\|}{C}}R''$ (C) | Molar ratio A:B:C | Temp., °C. | Solv. | $R'^1\overset{R''}{\underset{\|}{C}}=CX^1X^2$ (E) |
|---|---|---|---|---|---|---|---|
| XXIII | Triphenyl- | F F Br Br | 2-indanone | 1 10 0.5 | 10 | None |  |
| XXIV | Tris(2-cyano-ethyl)- | Cl Cl Cl Cl | Indenone | 1 10 0.5 | 75 | do |  |
| XXV | Diphenyl-p-chlorophenyl | Cl Cl Cl Cl | 1-tetralone | 1 8 0.5 | 40 | do |  |
| XXVI | Triphenyl- | Cl Cl Cl Cl | Anthrone | 1 12 0.5 | 60 | do |  |
| XXVII | Triphenyl- | F F Br Br | Benzanthrone | 1 10 0.5 | 60 | do |  |

*Closed system under autogenous pressure.

Compounds of the present invention may be copolymerized with vinyl acetate, acrylonitrile, styrene, and the like, to give thermoplastic polymers manifesting flame resistant properties. In addition, compounds of the present invention are useful as insecticides, e.g. against houseflies, mosquito larvae, and the like.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:

1. A method for the production of compounds of the formula

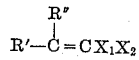

which comprises reacting together as sole reactants a tertiary phosphine of the formula $R_3P$, a polyhalomethane of the formula $CX^1X^2X^3X^4$, and a carbonyl compound of the formula

by bringing said reactants into intimate contact with each other at a temperature in the range of −25° C. to 200° C.; R, above, representing a member selected from the group consisting of alkyl having from 1 to 18 carbon atoms, substituted alkyl having from 1 to 18 carbon atoms, aryl, substituted aryl, and cycloalkyl, said substituents for alkyl and aryl being selected from the group consisting of cyano, lower alkoxy and halo; R' represents a member selected from the group consisting of hydrogen, alkyl having from 1 to 12 carbon atoms, alkenyl having from 1 to 12 carbon atoms, phenyl, naphthyl, cyclohexyl, benzoyl, furfuryl, styrenyl, halo-substituted alkyl having 1 to 12 carbon atoms, and halo-substituted phenyl; R'' represents a member selected from the group consisting of hydrogen, alkyl having from 1 to 12 carbon atoms, alkenyl having from 1 to 12 carbon atoms, phenyl, naphthyl, cyclohexyl, furfuryl, styrenyl, halo-substituted alkyl having from 1 to 12 carbon atoms, and halo-substituted phenyl, and R' and R'' combined represent the residue of a member of the group consisting of fluorenone, 1-indanone, 2-indanone, 1-tetralone, indenone, anthrone, and benzanthrone; $X^1$ represents a member selected from the group consisting of hydrogen, chlorine, bromine and fluorine, and $X^2$ represents a member selected from the group consisting of chlorine, bromine and fluorine; and $X^3$ and $X^4$ each represent a member selected from the group consisting of chlorine, bromine and iodine.

2. The process of claim 1 wherein the temperature is in the range of 50° C. to 150° C.

3. The process of claim 1 wherein the reactants are triphenylphosphine, carbon tetrachloride and benzaldehyde and the product is β,β-dichlorostyrene.

4. The process of claim 1 wherein the reactants are triphenylphosphine, carbon tetrachloride and acetophenone and the product is 1,1-dichloro-2-phenyl-propene-1.

5. The process of claim 1 wherein the reactants are triphenylphosphine, dibromodifluoromethane and benzaldehyde and the product is $\beta,\beta$-difluorostyrene.

6. The process of claim 1 wherein the reactants are triphenylphosphine, carbon tetrachloride and benzophenone and the product is 1,1-diphenyldichloroethylene.

7. The process of claim 1 wherein the reactants are triphenylphosphine, carbon tetrachloride and 9-fluorenone and the product is 9-dichloromethylenefluorene.

References Cited by the Examiner
UNITED STATES PATENTS
3,095,455   6/1963   Marco et al.

OTHER REFERENCES
Speziale et al., "J. Am. Chem. Soc.," vol. 82, pp. 1260 (1960).

LEON ZITVER, *Primary Examiner.*